April 11, 1961    R. PIESKER    2,979,089
PORTABLE BATTERY-ENERGIZED SCREW DRIVER
Filed April 17, 1959
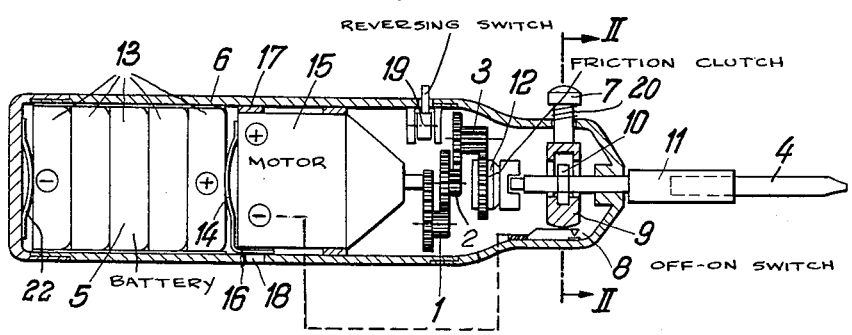
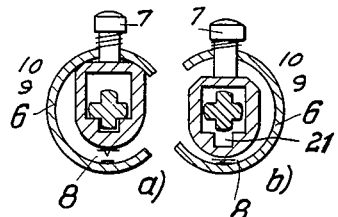
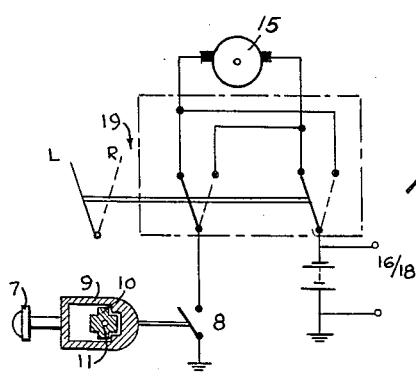
Inventor:
Richard Piesker
By
Bailey, Stephens & Huettig
Attorneys

United States Patent Office 2,979,089
Patented Apr. 11, 1961

2,979,089

PORTABLE BATTERY-ENERGIZED SCREW DRIVER

Richard Piesker, Buffalo, N.Y., assignor to Hanns Fickert and Richard Wenninger, both of Frankfurt am Main, Germany Filed Apr. 17, 1959, Ser. No. 807,133

Claims priority, application Germany Apr. 24, 1958

5 Claims. (Cl. 144—32)

The present invention relates to a battery-energized electric screw driver or similar tool.

There have been tools of this type known prior to this invention which had a hollow handle in which the part for connecting the tool to a power supply line, an electric motor, a speed reduction gear and a friction clutch were mounted which was designed to insure that the required torque for tightening a particular kind of screw would be maintained. These tools had to be connected by a cable to a power line and were therefore dependent upon the existence of a convenient power outlet near the place of work. Furthermore, even though the outlet was located in the near vicinity of the point where such a screw driver was to be used so that the cable did not have to be of any excessive length, the mere existence of the cable always constituted a hindrance in the use of the tool.

It is therefore an object of the persent invention to provide an electric screw driver or similar tool which is independent of any power outlet and may be used like an ordinary hand screw driver at any place where no power outlet is available. Another object of the invention is to provide an electric screw driver or similar tool which may be more easily manipulated because of the absence of a connecting cable and the drag exerted thereby on the tool than was possible with previous electric screw drivers.

In order to attain these objects, the present invention provides an electric screw driver which is outwardly similar to an electric screw driver of the known type as described above, except for the absence of any cable for connecting the tool to a power line. The screw driver according to the invention therefore also has a hollow handle in which the driving elements including an electric motor, a speed reduction gear, and a friction clutch are mounted. However, aside from these driving elements, the hollow handle also contains a suitable electric battery for supplying the necessary current to the electric motor which in this case is a low-voltage motor. Of course, the hollow handle also contains an electric switch for switching the motor on or off.

Since a battery of a size which can be easily mounted within the hollow handle of the screw driver cannot supply the motor with sufficient power to produce the necessary torque for fully tightening particularly a larger screw, it is a further object of the invention to provide a special locking mechanism which is operatively associated with the motor switch and designed to permit the tool-supporting member or the shaft within the tool handle carrying the same to be locked to the tool handle when the power of the motor supplied by the battery is no longer sufficient to turn the screw and when the friction clutch, which is adjusted to the power of the motor and the capacity of the battery, begins to slip.

The present invention therefore concerns a special switch construction which consists of a combination of an electric switch for operating the motor and a special locking device similar to a dog clutch or the like, one part of which is positively connected to the screw driver handle, while the other part is secured to the tool-supporting member or the drive shaft carrying the same which, through the friction clutch, is connected to the speed-reduction which is driven by the motor.

It is therefore a feature of the mentioned switch to serve, on the one hand, for connecting and disconnecting the motor circuit, and, on the other hand, for positively locking the actual screw driver or other tool to its handle when the switch is in the disconnecting position and for releasing the locking device when the switch is in the connecting position.

The electric screw driver according to the invention may therefore be used even for installing very large screws. The operator of the tool then only has to depress the pushbutton of the switch on the tool handle to start the motor and at the same time to release the dog clutch. The actual tool is then driven by the motor to turn the screw until the torque required to tighten the screw exceeds that supplied by the motor so that the friction clutch which is interposed between the tool and the speed reduction gearing will then start to slip. If the operator wishes to tighten the screw completely, he then releases the pushbutton of the switch and thereby simultaneously locks the tool rigidly to the handle and switches off the motor current. He may then operate the screw driver like any ordinary hand screw driver.

The electric screw driver according to the invention is therefore primarily intended for speeding up the tedious work of threading a screw or bolt into a workpiece or a nut until it has finally come to the point where a considerable force is required to tighten it in such workpiece or nut, that is, a job which requires a certain sensitivity which depends upon the type of workpiece and the strength of the screw and the screw threads thereon, and which in most cases is more safely and properly carried out by hand than by a machine.

By further providing a motor-reversing switch in the hollow handle it is also possible to use the new screw driver for tightening screws with left-hand threads or for withdrawing screws either with right-hand or left-hand threads. In the latter case, the procedure as previously described is reversed, the screw driver is first turned by hand to loosen the screw, whereupon the pushbutton of the motor switch is depressed to start the motor and at the same time to disengage the locking device. By the provision of the locking device it is thus also possible to loosen and remove screws which are very firmly tightened or have become corroded in the tightened position. This could not be done with the known types of electric screw drivers which had no locking device, since the friction clutch of such a screw driver would disengage or slip if the motor could not produce the required torque to loosen such a locked screw.

The battery which is mounted in the tool handle preferably consists of a plurality of dry cells which may be exchanged when depleted or may be permanently mounted in the handle if the latter is also provided with suitable contacts to permit the battery to be connected to a charger or if a charger is also mounted within the handle so that the entire tool may be plugged into an electric outlet.

The tool-supporting member of the new machine is preferably designed to permit different tools as well as tools of different sizes to be removably secured thereto. Thus, for example, screw drivers of different sizes may be attached or different socket wrenches for using the machine as a nut runner and for tightening and loosening nuts.

These and other objects, features, and advantages of the present invention will be further apparent from the following detailed description thereof, particularly when read with reference to the accompanying drawings, in which—

Figure 1 shows a longitudinal section of the screw driver according to the invention; while Figures 2 and 3 show a cross section of the push-button switch taken along line II—II of Figure 1 in two different operating positions of the switch.

Fig. 4 is a wiring diagram.

Referring to the drawings, the metal housing 6 forming the handle of the screw driver contains a series of battery cells 13, which forms a battery 5, preferably of the nickel-cadmium type which do not require any service and do not need to be exchanged. In front of the battery cells 13 the electric motor 15 is mounted which is supplied with the current furnished by the battery. The rotor of the motor is connected to a speed reduction gear 1, 2, 3, the other end of which is connected to a friction clutch 12 which is designed to provide a friction torque in accordance with the capacity of the battery 5. The front end of the friction clutch 12 engages with the tool support 11 into which the different kinds of tools, for example, a screw driver, a stirrer, or the like may be removably inserted and locked against rotation. The shaft of the tool support 11 has a cross-shaped portion 10 thereon which is substantially enclosed by a cage 9. This cage 9 is secured to a pushbutton 7 which is slidably mounted in the front end of the metal housing 6 against the action of a coil spring 20. Cage 9 has a recess 21 therein into which any one of the four projections of the crosspiece 10 may engage when the pushbutton 7 is in the released position, as shown in Figure 3, so that the tool support 11 with the tool 4 thereon will then be locked to the cage 9 and thus also to the outer housing 6. If, however, the pushbutton 7 is depressed against the action of spring 20, as shown in Figure 4 the crosspiece 10 will be released from the recess 21 and at the same time cage 9 will press upon an electric spring contact 8 and connect the same with its associated stationary contact whereby the motor will be connected to the battery 5 and drive the tool 4 through the gears 1, 2, 3, the friction clutch 12 and the tool support 11. As soon as pushbutton 7 is released, cage 9 will snap back to the position shown in Figures 1 and 3, so that the crosspiece 10 will again enter the recess 21. The tool 4 will then again be in the position in which it can be turned only by a manual rotation of housing 6 for the purpose of producing a torque greater than that which can be produced by the motor 15, for example, for tightening a screw or releasing it from the fully tightened position.

Coil spring 20 may also be omitted if the spring contact 8 constantly engages with the lower side of cage 9 and is made of sufficient strength to shift the cage to the locking position when pushbutton 7 is released.

Housing 6 further carries a pushbutton-operated motor-reversing switch 19 which permits the direction of rotation of the motor 15 to be reversed for driving or withdrawing a screw. The motor-reversing switch 19 and the switch contact 8 are connected to the battery 5 and the motor 15 in the usual manner through a spring 14 engaging one terminal of the battery 5 and secured by a conducting strip 16 and an insulating washer 17 and 18 to the housing 6, and through another spring 22 which is connected to the housing 6 and engages the other terminal of battery 5. The battery arrangement may be, as shown in Figure 1, that is, similar to one of a flashlight, or it may also be designed so as to be rechargeable by being plugged into an electric outlet.

Although by invention has been illustrated and described with reference to the preferred embodiment there-of, I wish to have it understood that it is in no way limited to the details of such embodiment, but is capable of numerous modifications within the scope of the appended claims.

Having thus fully disclosed my invention, what I claim is:

1. An electric screw driver comprising a hollow handle forming a housing, an electric battery, an electric motor, speed reduction gearing, and a tool-supporting member disposed in alignment with each other within said housing, and an electric switch mounted on and partly within said housing and having an operating part extending toward the outside of said housing for connecting said motor to said battery and for disconnecting it therefrom, said switch having means for locking said tool-supporting member to said housing when said switch is in the disconnecting position and for releasing said tool-supporting member from said housing so as to be rotatable by said motor when said switch is in the connecting position.

2. An electric screw driver as defined in claim 1, further comprising a friction clutch within said housing and disposed between said speed reduction gearing and said tool-supporting member, said clutch exerting a friction torque equal to the torque of the motor when energized by the battery.

3. An electric screw driver as defined in claim 1, wherein said switch comprises a pushbutton slidably mounted within the wall of said housing and having a free end projecting toward the outside, a cage secured to the other end of said pushbutton within the front part of said housing and having opposite apertures in its side walls and an inner locking recess within its bottom, said tool-supporting member forming a shaft extending through said apertures and having a cross-shaped portion within said cage, any projection of said cross-shaped portion being adapted to enter said recess when said pushbutton is released, so as to lock said tool-supporting member to said housing and to be released from said recess and to be freely rotatable within said cage when said pushbutton is depressed, and a pair of switch contacts within said housing adapted to be closed when said pushbutton is depressed and said cross-shaped portion is released from said recess and to be opened when said pushbutton is released and said cross-shaped portion enters said recess.

4. An electric screw driver as defined in claim 3, wherein one of said switch contacts is a spring resiliently engaging the lower surface of said cage for normally maintaining said tool-supporting member in the locked position and said switch contacts in the open position.

5. An electric screw driver as defined in claim 3, further comprising a spring for normally maintaining said pushbutton in the released position, said tool-supporting member in the locked position, and said switch contacts in the open position.

References Cited in the file of this patent

UNITED STATES PATENTS

| 873,123   | Gardy    | Dec. 10, 1907 |
| 2,161,300 | Kolstad  | June 6, 1939  |
| 2,272,279 | Schindel | Feb. 10, 1942 |
| 2,664,020 | De Note  | Dec. 29, 1953 |
| 2,701,490 | Griparis | Feb. 8, 1955  |

FOREIGN PATENTS

| 289,948   | Switzerland | July 16, 1953 |
| 991,485   | France      | June 20, 1951 |
| 1,133,470 | France      | Nov. 19, 1956 |
| 1,173,583 | France      | Oct. 27, 1958 |